W. G. McCLEAVE.
TRUCK.
APPLICATION FILED APR. 25, 1919.
1,371,211.
Patented Mar. 8, 1921.
2 SHEETS—SHEET 1.
Fig. 1.
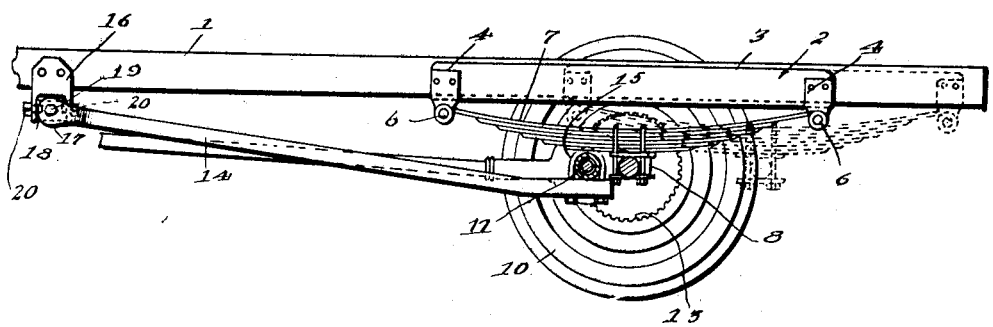
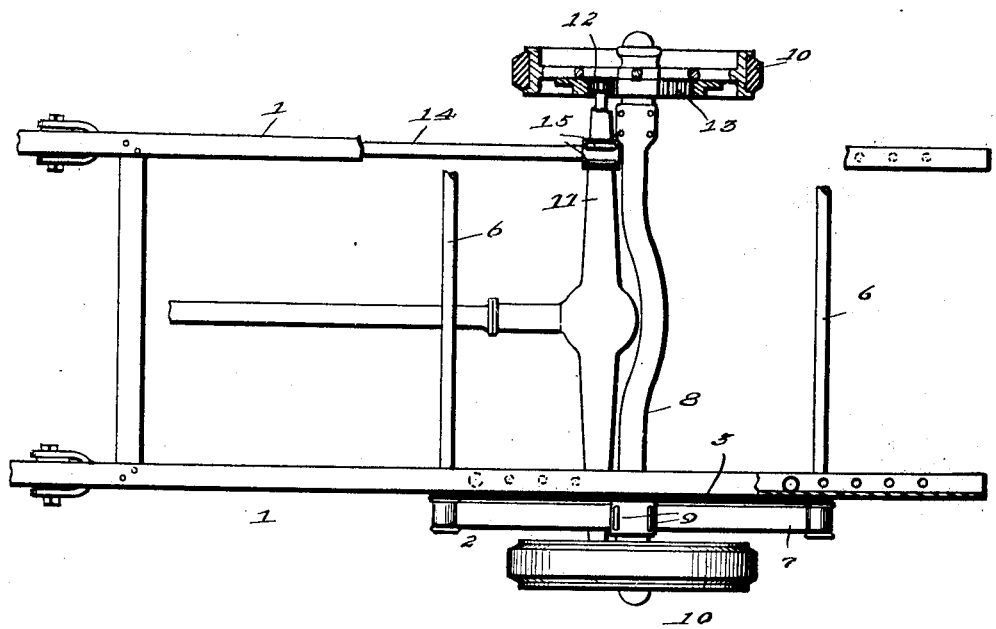
Fig. 3.
Witnesses
R. A. Thomas
Inventor
W. G. McCleave
By Victor J. Evans
Attorney W. G. McCLEAVE.
TRUCK.
APPLICATION FILED APR. 25, 1919.
1,371,211.
Patented Mar. 8, 1921.
2 SHEETS—SHEET 2.
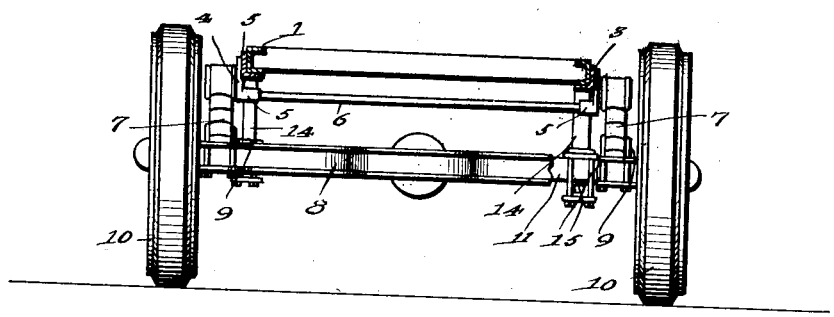
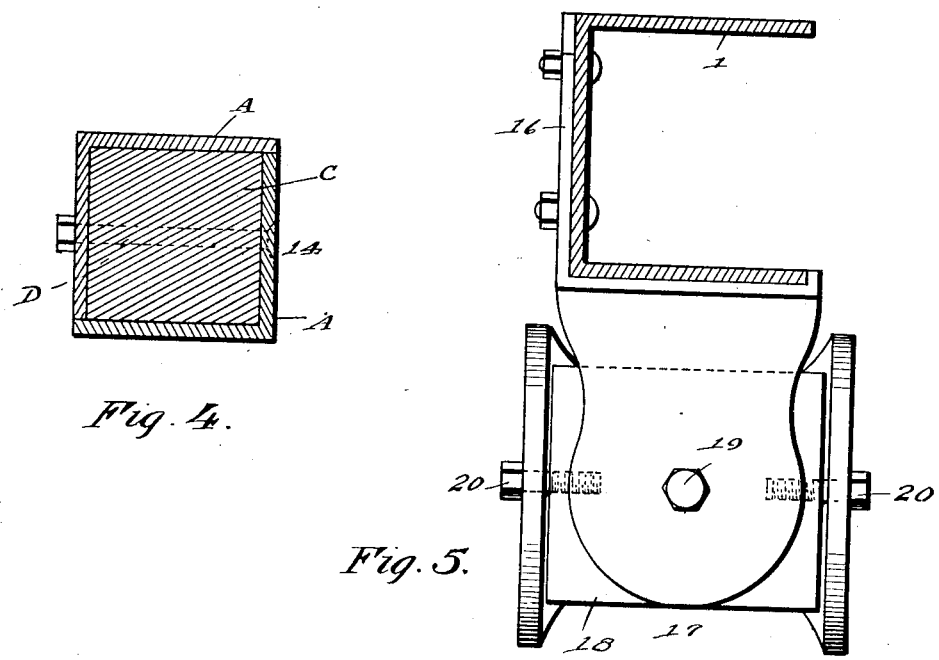
Witnesses
R. A. Thomas
Inventor
W. G. McCleave
By Victor J. Evans
Attorney

UNITED STATES PATENT OFFICE.

WILLIAM GEORGE McCLEAVE, OF GIBSONIA, PENNSYLVANIA.

TRUCK.

1,371,211.  Specification of Letters Patent.  Patented Mar. 8, 1921.

Application filed April 25, 1919. Serial No. 292,632.

*To all whom it may concern:*

Be it known that I, WILLIAM G. McCLEAVE, a citizen of the United States, residing at Gibsonia, in the county of Allegheny and State of Pennsylvania, have invented new and useful Improvements in Trucks, of which the following is a specification.

This invention relates to improvements in trucks, and the principal objects of the invention is to provide means for converting a truck into a tractor or into a truck having larger drive wheels.

Another object of the invention is to provide a frame for carrying the supporting axle for the rear wheels with means for adjusting the position of said frame on the main frame.

Another feature of the invention relates to the means for attaching the shaft carrying the driving pinions to the main frame.

The invention also consists in certain other features of construction and in the combination and arrangement of the several parts, to be hereinafter fully described and illustrated in the accompanying drawings and specifically pointed out in the appended claims.

In describing my invention in detail, reference will be had to the accompanying drawings wherein like characters of reference denote like or corresponding parts throughout the several views, and in which:

Figure 1 is a side view of the chassis of a truck constructed in accordance with my invention.

Fig. 2 is a rear view.

Fig. 3 is a plan, partly in section

Figs. 4 and 5 are detailed views.

In these views, 1 indicates the main frame of the truck, which is constructed as usual, and 2 indicates my auxiliary frame, which is adjustably secured on the rear part of the main frame. This auxiliary frame comprises a pair of angle bars 3, which engage with the lower parts of the side members of the main frame. Each of these bars carries a pair of clips 4, which are provided with the bearings 5 for receiving the spring-engaging bars 6. The ends of the semi-elliptical springs 7 are secured to these bars in the usual manner. The central parts of the springs 7 are secured to the rear axle 8 by the brackets 9 and the rear wheels 10 are secured to said axle in the usual manner. The auxiliary frame may be connected with the main frame by bolts or the like, in which case the main frame is provided with a series of holes so that the position of the auxiliary frame on said main frame may be adjusted.

11 indicates the drive shaft which is connected with the motor in the usual manner, and at its ends this shaft is provided with the pinions 12 which engage with the annular rack 13 on the rear wheels. The drive shaft 11 is connected with the torque rods 14 by means of the U-bolts 15 or the like, and said rods are movably connected with the brackets 16 carried to the main frame by the movable joints 17. Each of these joints is composed of a block 18 pivotally connected to the forked end of the bracket 16 by the pins 19 and to the forked end of each torque rod by the pins 20. It will thus be seen that the torque rods have movement in two directions on the main frame so that the drive shaft is yieldingly supported. This drive shaft is provided with the usual differential gearing, which is connected with the motor in the usual manner. In this way, when the drive shaft is rotated the rear wheels will be revolved by the pinions engaging with the teeth on the inner walls of the annular members, 13. When the rear truck wheels are to be replaced by tractor wheels or larger truck wheels, the auxiliary frame is moved rearwardly on the main frame to space the supporting axle a greater distance from the drive shaft, as shown in dotted lines in Fig. 1. This is necessary on account of the tractor wheels or larger truck wheels having a rack of greater diameter, so that the supporting axle is placed in such a position that the pinions on the drive shaft will properly engage the racks on the larger wheels. It will also be seen that the larger wheels are driven at a slower speed.

I prefer to make the torque rods from a pair of angle irons A and B and a beam C of hard wood which is embraced by said angle irons. The parts are held together by the bolts D.

What I claim is:—

1. In combination with the main frame of a truck, an auxiliary frame having its side bars, means for adjustably connecting the side bars of the auxiliary frame to the side bars of the main frame, springs carried by said auxiliary frame, a rear axle carried by said springs, wheels carried by said axle, a transversely arranged drive shaft carried by the main frame and means for transmitting the motion of the drive shaft to the wheels.

2. In combination with the main frame of a truck, an auxiliary frame for supporting the rear of the main frame and having its side bars adjustably connected with the side bars of the main frame, a rear axle carried by the frame, wheels carried by said axle, a transversely arranged drive shaft, means for driving the said wheels from said drive shaft, torque rods connected with the drive shaft and universal joints connecting the front ends of said rods with the main frame.

In testimony whereof I affix my signature.

WILLIAM GEORGE McCLEAVE.